June 18, 1957  R. E. WALLIN  2,796,149
VIBRATION DAMPENING ATTACHMENT
Filed Dec. 30, 1952

INVENTOR.
Robert E. Wallin
BY Richard E. Babcock Jr.
Attorney

United States Patent Office 2,796,149
Patented June 18, 1957

2,796,149

VIBRATION DAMPENING ATTACHMENT

Robert E. Wallin, New Holland, Pa., assignor, by mesne assignments, to Sperry Rand Corporation, New Holland, Pa., a corporation of Delaware Application December 30, 1952, Serial No. 328,581

1 Claim. (Cl. 188—1)

This invention relates to a vibration dampening attachment for use in dampening reciprocatory vibrations in machine frames or other bodies subjected to such vibration.

It is an important aim of the invention to provide a vibration dampener or attachment adapted to be produced and sold as a self-contained unit for easy application to a vibrating body to dampen the vibrations thereof.

A further aim of the invention is to provide a novel combination between such a vibration dampener and a vibrating body. In particular the invention contemplates a novel manner of applying the vibration dampener to a conventional reciprocating mower to dampen the reciprocatory vibrations transmitted to the mower frame from the reciprocating sickle bar which is supported from said frame.

I attain these objects through the provision of a counter reciprocating dampening element which is supported on the vibrating body for reciprocation parallel to the vibrations of the body and resiliently coupled to the body for reciprocation in out-of-phase relation to the reciprocation thereof, so that the reciprocations or vibrations of the body and the element will at least partially oppose and attenuate each other.

In the preferred embodiment of the invention, the counter reciprocating element is arranged so that its vibration lags behind that of the body by approximately 180°, or in other words so that it vibrates in substantially opposite phase with the body, to thus obtain the maximum dampening effect possible.

It is also an object of the invention to provide for adjustment of the extent to which the vibrations of the counter-reciprocating element are out of phase with those of the main body.

Figure 1:
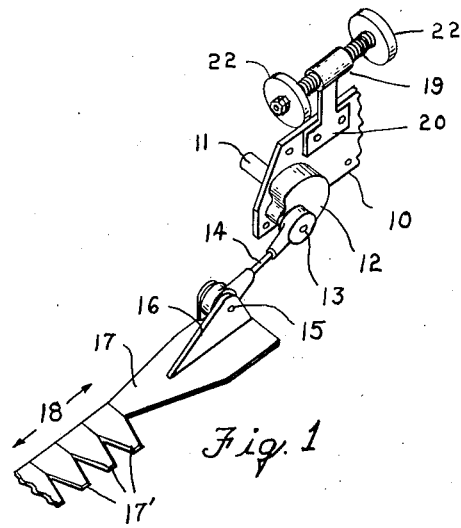
Figure 2:
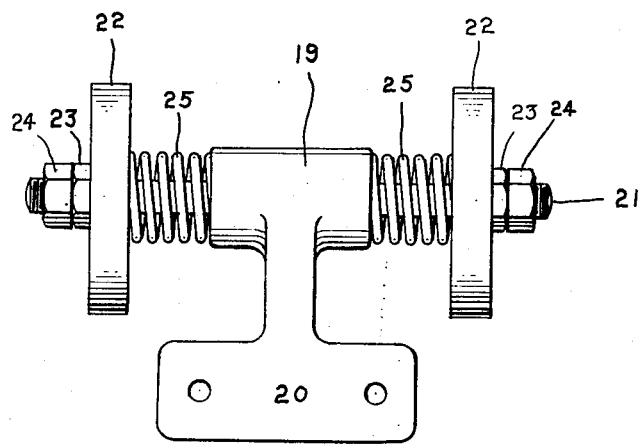

The foregoing as well as other incidental objects and advantages are attainable by the preferred embodiment of the invention illustrated in the accompanying drawings. In which:

Figure 1 represents a diagrammatic perspective view, in which certain parts are broken away, illustrating the manner in which the invention may be applied to a conventional reciprocating mower; and Figure 2 represents a front elevation, on a somewhat enlarged scale as compared to Figure 1, of the vibration dampening attachment or unit of the invention.

Referring now in detail to the accompanying drawings, the reference character 10 designates a portion of a conventional mower frame through which is journalled a shaft 11 rotated from any suitable source (not shown) and having fixed on one end thereof a usual counterbalanced disc 12 having an eccentric crank pin or wrist pin 13 carried thereby. A connecting rod 14 having one end journalled on said pin 13, has its other end pivotally connected as at 15 to bracket means 16 on the usual reciprocating sickle bar 17.

It should be understood that the sickle bar 17 will be guided for reciprocating movement in the direction of the arrows 18 in a usual rigid cutter bar structure (not shown) whereby its several sickle knives 17' may cooperate with ledger plates carried on the finger guards of the cutter bar to mow usual crop material in conventional manner.

The foregoing structure is entirely conventional and is not claimed per se as my invention, but is thus shown and described merely in order to facilitate an intelligent understanding of the invention and of the preferred mode contemplated by me of carrying it into practice.

The vibration dampening attachment of the invention comprises a slide bearing 19 rigidly supported on the frame 10, as by means of an integral base 20 bolted or otherwise affixed to the frame 10 as shown. It will be appreciated, however, that the slide bearing 19 may be formed integral with or otherwise incorporated in the frame structure if so desired.

Guided in the bearing 19 for reciprocation parallel to the vibratory movement which is transmitted from the sickle bar to the frame or body 10 is a slide rod 21. Rod 21 is slidable in a bore, not shown, in bearing 19, having sliding peripheral engagement with the walls of the bore. The axis of the bore is parallel to the direction of reciprocation of frame 10 thereby controlling the direction of a movement of rod 21. The rod 21 constitutes a part or portion of the weighted slide or counter reciprocation element of the invention. The slide also includes the relatively axially spaced weights or masses 22—22 axially slidably supported on the rod 21 in relatively spaced relation as determined by the adjustment of the jam nuts 23, 24 respectively disposed or threaded on opposite ends of the rod 21 in abutment with the outer faces of the weights 22 to limit the axial spacing of the weights 22.

Any suitable resilient means may be supplied for coupling the slide to the bearing 19 (and through the bearing 19 to the frame member or body 10) for reciprocation in an out-of-phase relation to the bearing, responsive to reciprocation of the bearing and its supporting body 10. The resilient means shown for purposes of exemplification comprise the coil springs 25—25 respectively disposed about the rod 21 under compression between the slide bearing 19 and the respective weights 22.

In the operation of the invention as the sickle bar 17 is reciprocated, reciprocatory vibration will be transmitted from it through the connecting rod 14 to the supporting frame or body 10 which will of course be caused to reciprocate or vibrate substantially in the same direction as the sickle bar 17.

Due to the inertia of the weights 22 and the resilient coupling afforded by the springs 25 between them and the bearing 19 of the supporting body 10, the vibration of the weights or slide will lag relative to, and thus be out of phase with, the vibration of the supporting body 10. Thus the relatively out-of-phase vibration of the slide or counter-reciprocating element will at least partially oppose and dampen the vibration of the supporting body 10. In the preferred embodiment of the invention the size or the extent of the weights 22, the amplitude of vibration thereof and the stiffness of the springs 25 will be so selected and related, through the application of conventional mechanical principles, as to cause the weights, and thus the slide in its entirety, to vibrate in substantially opposite phase to the sickle bar within the range of usual operating speed of the latter.

By suitable adjustment of the nuts 23 and 24 it will be seen that the amplitude of vibration and thus the vibrational frequency of the slide may be adjusted within a substantial range as desired for different operational speeds of the sickle bar.

It will be readily apparent from the foregoing that the attachment of the invention is well adapted for application to other vibrating bodies than that specifically illustrated and that it requires no connection to the operating parts or drive mechanisms of the mower or other machine with which it may be associated.

In this application, I have shown and described only the preferred embodiment of my invention simply by way of setting forth the best mode contemplated by me of carrying out my invention. However, I recognize that the invention is capable of other embodiments and that its several details may be modified in various ways all without departing from the invention.

Accordingly, the drawings and description herein are to be construed as merely illustrative in nature and not as exclusive.

Having thus described my invention, I claim:

In combination with a body which is reciprocable at substantially a constant rate, a vibration dampener comprising a slide bearing affixed to said body and reciprocable therewith, said bearing having a bore the axis of which extends parallel to the direction of reciprocation of said body, a reciprocable rod projecting through said bearing, said rod extending through said bore and having peripheral engagement with the walls of the bore whereby the rod is guided in its reciprocating movements, a pair of weights, one on each end of said rod and on opposite sides, respectively, of said bearing, a first coil spring disposed on said rod under compression between said bearing and one of said weights, a second coil spring disposed on said rod under compression between said bearing and the other of said weights, said springs urging said weights outwardly and away from each other, and means limiting the outward movement of said weights, said limiting means being adjustable to maintain said springs under such compression that the reciprocation of said weights and rod is caused to be in opposite phase to the constant reciprocations of said body.

References Cited in the file of this patent

UNITED STATES PATENTS

| | | |
|---|---|---|
| 992,134 | Kelly | May 9, 1911 |
| 1,819,665 | Wiltse | Aug. 18, 1931 |
| 1,829,251 | Whittington et al. | Oct. 27, 1931 |
| 1,867,708 | Paton | July 19, 1932 |
| 2,271,935 | Buchanan et al. | Feb. 3, 1942 |
| 2,586,043 | Hodgson et al. | Feb. 19, 1952 |
| 2,635,898 | Silverman | Apr. 21, 1953 |